United States Patent [19]
Elias

[11] Patent Number: 4,744,076
[45] Date of Patent: May 10, 1988

[54] BUS STRUCTURE HAVING CONSTANT ELECTRICAL CHARACTERISTICS

[75] Inventor: John G. Elias, Wilmington, Del.

[73] Assignee: E. I. Du Pont de Nemours and Company, Wilmington, Del.

[21] Appl. No.: 893,880

[22] Filed: Aug. 6, 1986

[51] Int. Cl.[4] ............................. H04J 3/02; H04B 3/00
[52] U.S. Cl. ........................................ 370/85; 375/36; 333/32
[58] Field of Search .............. 370/85; 375/36; 333/32; 328/221

[56]  References Cited
U.S. PATENT DOCUMENTS

| | | | |
|---|---|---|---|
| 3,516,065 | 6/1970 | Bolt et al. | 340/170 |
| 3,832,575 | 8/1974 | Dasgupta et al. | 375/36 |
| 4,063,220 | 12/1977 | Metcalfe et al. | 340/147 LP |
| 4,158,220 | 6/1979 | Yamamoto et al. | 361/415 |
| 4,395,710 | 7/1983 | Einolf, Jr. et al. | 340/825.5 |
| 4,454,552 | 6/1984 | Barnes et al. | 361/9 |
| 4,475,191 | 10/1984 | James et al. | 370/85 |
| 4,602,364 | 7/1986 | Herman et al. | 370/85 |
| 4,638,311 | 1/1987 | Gerety | 370/85 |
| 4,677,613 | 6/1987 | Salmond et al. | 370/85 |

OTHER PUBLICATIONS

Rees, Roger, Small ECL Improves Data Bus of FPS-264 Computer, "Digital Design," vol. 15, No. 2, Feb. 1985, p. 91.

"MECL System Design Handbook," May 1982, Bussing with MECL 10,000 Integrated Circuits, pp. 210-215.

Primary Examiner—Douglas W. Olms

[57] ABSTRACT

A data transmission bus arrangement in which the transceiver arrays through which a main bus communicates with functional circuit modules are physically disposed on the same substrate that carries the bus.

6 Claims, 1 Drawing Sheet

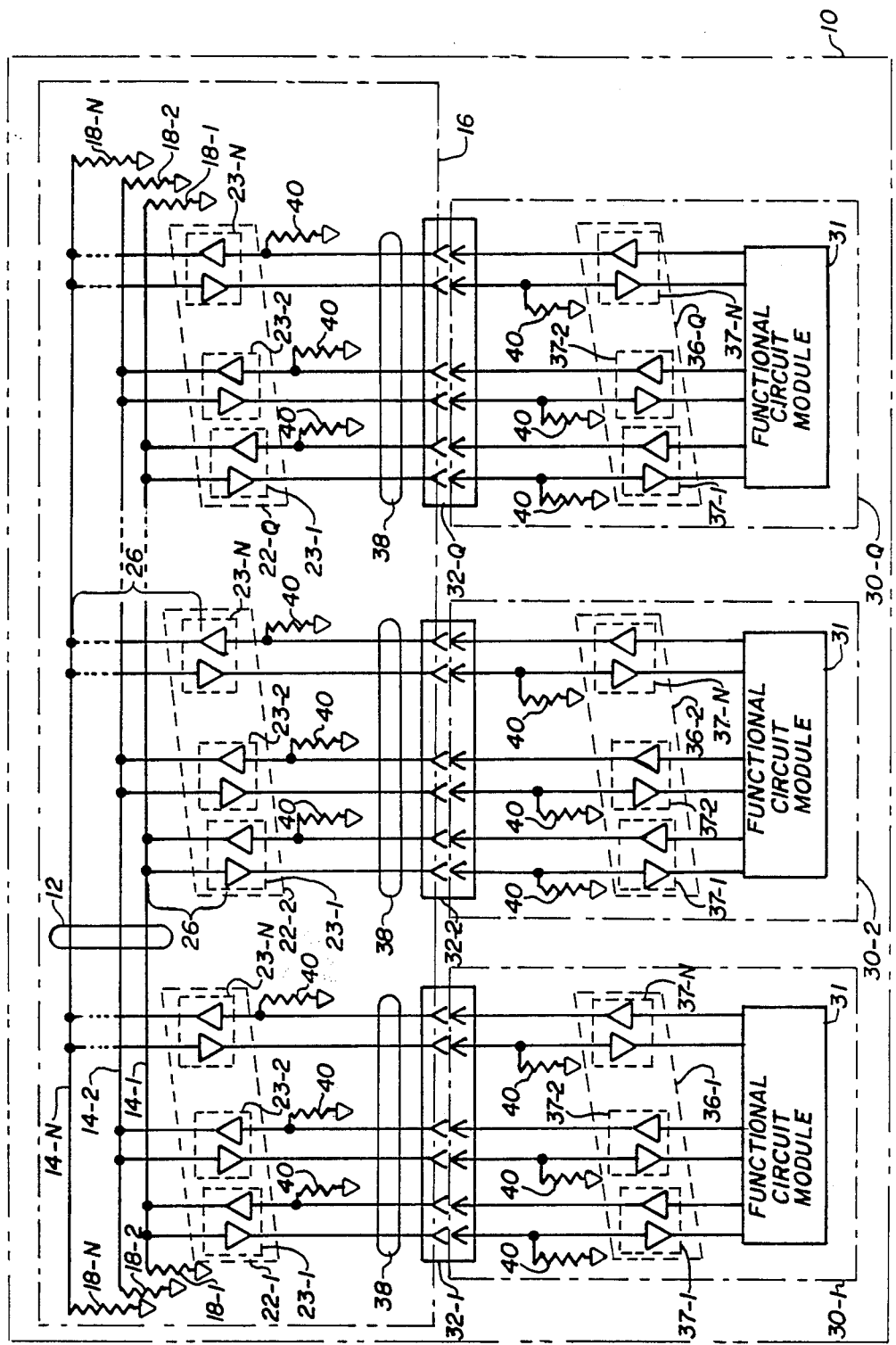

BUS STRUCTURE HAVING CONSTANT ELECTRICAL CHARACTERISTICS

BACKGROUND OF THE INVENTION

1. Field of the Invention

The present invention relates to a high speed data communications system and in particular to a transceiver mounting arrangement for such a system.

2. Description of the Prior Art

In high speed data communications systems using computers it is recognized that the electrical characteristics of the signal paths, or "buses", interconnecting various circuit modules of the system become increasingly critical as transmission rates increase and as logic transition times decrease. These buses, whether realized as traces on a circuit board, coaxial cables, twisted pairs or individual wires, must be considered as transmission lines. To achieve error-free, high speed digital transmission the transmission lines must exhibit certain properties: uniform characteristic impedance (which requires uniform geometry) along their length; optimum characteristic impedance consistent with current sourcing capability of the driving circuit elements; proper terminations at the ends to prevent reflections; and high propagation velocity.

In the typical system the main system bus is disposed on a bus support substrate called a "motherboard" and the constituent modules of the system are disposed on separate dedicated support substrates, or "daughterboards". The overall data processing system is configured by physically interconnecting the daughterboards with the motherboards. The requisite properties of the main bus on the motherboard are adversely affected when daughterboards are removed from or added thereto.

In an attempt to minimize effects on the properties of the main bus, high input impedance transceivers are located on the daughterboard near the point at which it is received by the motherboard. However, the transceiver itself, as well as the "stub" or branch conductor through which the transceiver is interconnected to the bus, imposes non-negligible impedance and capacitive loads on the bus. These loads tend to change the properties of the bus when daughterboards are added or removed. For example, when daughterboards are present the effective impedance of the bus is lowered. Accordingly, precise termination of the bus (necessary to prevent signal reflections) is difficult to maintain.

Changes in the bus impedance caused by the absence or presence of transceivers along a bus are addressed by U.S. Pat. No. 4,475,191. In accordance with this patent where daughterboards are present the bus is terminated in a first impedance. Where the daughterboards are absent the bus is terminated in a second, higher, characteristic impedance. In addition a current driver with a deliberately lengthened rise time is used. Such a solution to the impedance matching problem, however, imposes limitations on the speed of operation and upon the transition time between logic levels.

The impedance and capacitive loads imposed on the bus by the stubs is recognized in the Motorola MECL Design Handbook. This reference work defines limitations on bus properties in relation to the number and length of the stubs and places upper limits on the length of the stubs in order to hold the effects of the stubs within tolerable limits.

In the related technology of local area networks, as typified by the Ethernet (TM) network, the properties of the coaxial cable bus used therein are maintained as constant as possible by utilization of transceivers mounted in cable tap units which are attachable along the bus. In such systems the transceivers are typically contained within the cable tap unit and are connected to the coaxial cable at designated locations by means of an insulation piercing connector arrangement. When the cable tap unit is removed the transceiver and connector are removed as well.

In view of the foregoing it is believed advantageous to provide a communications bus that exhibits precisely determinable impedance and time delay characteristics and that maintains these characteristics regardless of the presence or absence of associated circuit modules connected to the bus at all of the transceiver arrays provided for that purpose.

SUMMARY OF THE INVENTION

The present invention relates to an electronic system having a high speed communications bus exhibiting improved performance characteristics while retaining the practical convenience of configuration flexibility and modularity. The bus is physically disposed on a bus support substrate with associated electronic circuit modules being positioned on separate support substrates. The circuit modules are removably connected to the bus support substrate and communicate with the bus through transceiver arrays.

In accordance with the present invention the transceiver arrays are physically disposed on the bus support substrate with the minimum connection length being defined between the bus and each transceiver array. As a result of this structural arrangement the impedance and time delay characteristics of the bus remain substantially constant and are unaffected by placement or removal of functional circuit modules.

BRIEF DESCRIPTION OF THE DRAWINGS

The FIGURE is a stylized pictorial and schematic representation of an electronic data communications system having a bus transceiver arrangement positioned in accordance with the teachings of the present invention.

DETAILED DESCRIPTION OF THE INVENTION

Referring to the FIGURE shown is a stylized pictorial and schematic representation of a high speed data communications system 10 of the type able to facilitate the rapid transfer of data between functional elements of a data processing system. The data communications system 10 may find particular utility in connection with the transfer of large blocks of graphics or image data, such as that produced by a medical imaging system.

The system 10 includes a bus 12 formed of a plurality of individual signal conduction paths 14-1 through 14-N. The paths are disposed on the surface of or embedded within a suitable bus support substrate, or "motherboard", 16. Any convenient number of conduction paths is provided consistent with the word width of the data being processed and with system control needs. Each conduction path 14-1 through 14-N is terminated at each end with its respective matching characteristic impedance 18-1 through 18-N. The termination impedances 18 serve to prevent the generation of signal reflections back along each conduction path 14. The values of the impedances 18 are determinable when the motherboard 16 is assembled and are selected to precisely match the characteristic impedance of the conduction path 14. The bus 12 also exhibits determinable time delay characteristics which are a function of, among other things, the dielectric constant of the material of the substrate 16 and the length, geometry and physical proximity of the individual conduction paths 14, as will be readily appreciated by those skilled in the art.

A predetermined number of transceiver arrays 22-1 through 22-Q are distributed along the bus 12 with a predetermined spacing being defined between each transceiver array. Each transceiver array 22 includes transceiver elements 23-1 through 23-N. Each transceiver element 23 is electrically connected to its associated conduction path 14 of the bus 12 by a predetermined length 26 of conductor, commonly referred to as a "stub". The term stub is herein used to refer to that length 26 of conductor branching from a given conduction path 14 of the bus 12 to some active or passive circuit element, in this case the amplifier of the transceiver element 23. Suitable for use as each transceiver element 23 is an integrated circuit package such as those manufactured by Fairchild Camera and Instrument Corporation and sold under model number F100194. As used herein the length 26 of the stub includes not only the length of the conductors external to the transceiver package but also the length of the electrical leads which are part of the integrated circuit package. This total length is typically not more than 0.25 inches for reasons which shall be discussed herein.

The elements of the data communications system 10 are formed as functional circuit modules 31 disposed on separate support substrates 30-1 to 30-Q. Such substrates are commonly called "daughterboards". These daughterboards are typically connected to the motherboard 16 via respective suitable multi-pin electrical connectors 32-1 to 32-Q, although other suitable connection means may, of course, be used. Each of the functional circuit modules 31 on the daughterboards 30 communicates with the bus 12 through a dedicated transceiver array 22. Moreover, each of the daughter boards 30 is removably connectable to the motherboard 16 thus providing flexibility in configuring the data communications system 10.

Each of the daughterboards 30 carries a separate array 36 of transceiver elements 37 similar to the transceiver elements 23. The group of conductors disposed between each transceiver array 22 on the motherboard 16 and each transceiver array 36 on the daughterboard 30 define a secondary bus 38. This secondary bus 38 obviates the need for crowding the transceiver array 36 along the edge of the daughterboard 30 and in the vicinity of the connector 32 associated with that board as is typically practiced in the prior art. In the Figure the secondary bus 38 is comprised of a plurality of unidirectional conduction paths each connecting an associated transmitter of one transceiver element to an associated receiver of another transceiver element. Each conduction path of the secondary bus 38 is appropriately terminated at is receiving end by its characteristic impedance 40.

The structural arrangement in accordance with the present invention, wherein the transceiver arrays 22 are physically disposed on the motherboard 16, provides beneficial advantages over the systems of the prior art. Placement of the transceiver arrays 22 on the motherboard 16 effectively shortens the length 26 of the stubs. As a result the signal reflection delay from the stubs is always shorter than the rise time of even the fastest logic families, such as ECL and GaAs.

In addition, changes in the impedance and propagation delay of the bus 12 due to removal or insertion of daughterboards 30 are avoided. In the present system these parameters remain substantially constant, regardless of the presence or absence of a daughterboard 30 at a given connector 32. This is so because the transceiver arrays 22 always remain in place on the motherboard 16 and are not removed or added when a given daughterboard 30 is removed or added. Each conduction path 14 of the bus 12, therefore, is always presented with the impedance of the associated transceiver element 23 and its stub 26. It is thus possible to select termination impedances 18 that precisely match the characteristic impedance of the respective conduction path 14.

Those skilled in the art, having the benefit of the present invention as hereinabove described, may effect numerous modifications thereto. It is to understood, however, that these and other modifications lie within the contemplation of the present invention, as set forth in the appended claims.

What is claimed is:

1. In an electronic system of the type having a communications bus disposed on a bus support substrate, the bus having determinable impedance and time delay characteristics associated therewith, the bus having at least a first, a second and a third transceiver array connected thereto, the system having a first and a second functional circuit module respectively disposed on separate support substrates and respectively removably connectable to the bus support substrate and respectively communicable with the bus through the first and the second transceiver arrays, wherein the improvement comprises the transceiver arrays being positioned on the bus support substrate whereby the impedance and time delay characteristics of the bus remain substantially constant regardless of the absence or presence of a third functional circuit module connected to the third transceiver array.

2. The system of claim 1 wherein the bus is formed of a plurality of signal conduction paths and wherein the improvement further comprises a termination impedance selected to precisely match the characteristic impedance of each path being deposed on the bus support substrate at each end of the path.

3. The system of claim 1 wherein the improvement further comprises a secondary bus respectively connecting a transceiver array on the bus support substrate to a transceiver array on a separate support substrate.

4. The system of claim 2 wherein the improvement further comprises a secondary bus respectively connecting a transceiver array on the bus support substrate to a transceiver array on a separate support substrate.

5. The system of claim 4 wherein the secondary bus is formed of a plurality of conduction paths and wherein the improvement further comprises an impedance matching the impedance of each conduction path in the secondary bus connected to at least one end thereof.

6. The system of claim 3 wherein the secondary bus is formed of a plurality of conduction paths and wherein the improvement further comprises an impedance matching the impedance of each conduction path in the secondary bus connected to at least one end thereof.

* * * * *